United States Patent [19]

Herz

[11] 4,252,444

[45] Feb. 24, 1981

[54] APPARATUS FOR AGITATING LIQUIDS

[75] Inventor: Alvin E. Herz, Lakeland, Fla.

[73] Assignee: L. B. Foster Company, Pittsburgh, Pa.

[21] Appl. No.: 937,260

[22] Filed: Aug. 28, 1978

[51] Int. Cl.³ .............................................. B01F 11/00
[52] U.S. Cl. .................................... 366/117; 416/80; 405/211; 114/40
[58] Field of Search ............... 366/108, 117, 118, 128; 114/40, 41, 42, 222; 405/211, 216; 74/61, 86, 87; 416/79–83

[56] References Cited

U.S. PATENT DOCUMENTS

| 102,084 | 4/1870 | Brewbaker | 416/79 |
|---|---|---|---|
| 1,896,424 | 2/1933 | Rutherford | 416/79 |
| 2,784,119 | 3/1957 | McCown | 366/108 |
| 3,402,611 | 9/1968 | Schwenzfeir | 74/61 |
| 3,433,311 | 3/1969 | Lebelle | 74/61 |
| 3,530,814 | 9/1970 | Rastorguev | 114/40 |
| 3,710,964 | 6/1971 | Douglass | 366/117 |
| 4,046,515 | 9/1977 | deLeeuw | 366/117 |
| 4,077,225 | 3/1978 | Lichtenberger | 405/211 |

FOREIGN PATENT DOCUMENTS 197707   6/1977   U.S.S.R. .................................. 366/108

Primary Examiner—Trygve M. Blix
Assistant Examiner—D. W. Keen
Attorney, Agent, or Firm—Buell, Blenko, Ziesenheim & Beck

[57] ABSTRACT

An apparatus and method are provided for agitating liquids, maintaining solids in suspension and breaking up surface ice on waterways is provided in which a base plate having a plurality of dependent probes adapted to be immersed in a liquid to be agitated in subject to vibratory energy produced by selectively rotating eccentric weights in a vibratory case fixed on top of said base plate.

2 Claims, 5 Drawing Figures

APPARATUS FOR AGITATING LIQUIDS

This invention relates to methods and apparatus for agitating liquids and particularly to a method and apparatus in which a plurality of vibratory probes actuated by rotating eccentric weights project into the liquid to be agitated.

The problem of agitating liquids to maintain solids in suspension, to prevent or retard freezing, to break up ice being formed, to maintain water moving and prevent ice packs from forming are all well known. There have been many methods proposed for agitating liquids such as rotary propellor stirrers, rotary vane stirrers, ultrasonic transducers causing cavitation, air injection stirrers, etc. In all cases the apparatus used has a limited field of action and is generally expensive to install and maintain.

I have developed a method and apparatus which has broad applicability wherever it is desired to agitate liquids and which is particularly useful in preventing freezing of the liquid and the formation of ice packs. Preferably I provide a base plate, a plurality of spaced depending probes on said base plate, vane means on said probes, vibratory means connected on said base plate causing said plate, probes and vanes to vibrate and means on said vibratory means whereby said vibratory means, base plate, probes and vanes may be raised, lowered or held in place relatively to the liquid to be agitated. The vibratory means is a vibrating case carrying eccentric rotary weights which are timed and rotate at a selected controlled speed. Such vibratory cases are illustrated in La Belle U.S. Pat. Nos. 3,433,311 and 3,564,932 and the structures there shown are incorporated here by reference. As taught by La Belle the rotation of the weights can be caused by hydraulic, electric, air or steam power. The probes may be hollow or solid and of any desired structural shape such as a pipe or a wide flange beam. The probes may be provided with vanes on or interconnecting the probes.

In the foregoing general description I have set out certain objects, purposes and advantages of my invention. Other objects, purposes and advantages of this invention will be apparent from a consideration of the following description and the accompanying drawings in which.

Figure 1:
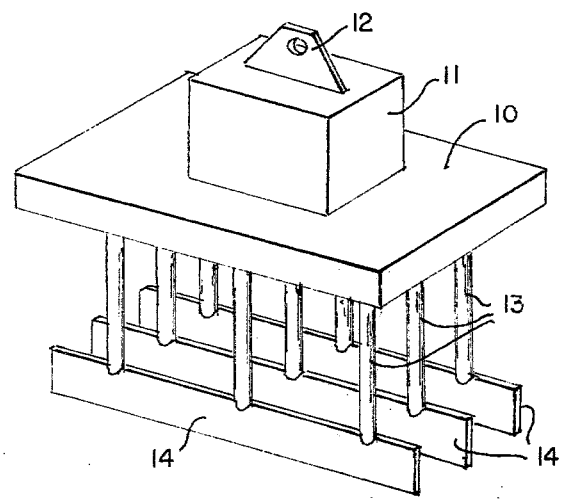
FIG. 1 is an isometric view of an apparatus of this invention particularly useful for agitating liquids.

Referring to the drawings I have illustrated in FIG. 1 a base or adapter plate 10 to which is attached a vibratory case 11 having rotating eccentrics as shown in La Belle U.S. Pat. No. 3,433,311 driven by hydraulic fluid from a source, not shown, but conventional. A lift ring 12 is provided on top of case 11 to permit raising and lowering of the assembly with a crane hook or the like, not shown. Depending from the base or adapter plate 10, are a plurality of probes 13 spaced apart in generally parallel rows. Each row is connected together by a steel plate vane 14.

In operation the rotating eccentrics of vibratory case 11 are set into operation transmitting vibrations into base or adapter plate 10 which in turn transmits the vibrations to probes 13 and vanes 14. The vibration of probes 13 and vanes 14 are immersed, to be agitated, mixing the liquid and any solids therein and breaking up the surface of the liquid into wavelets. It is this breaking of the surface which can be advantageously used to prevent freezing or solidification of the surface as more particularly described hereafter.

Figure 2:
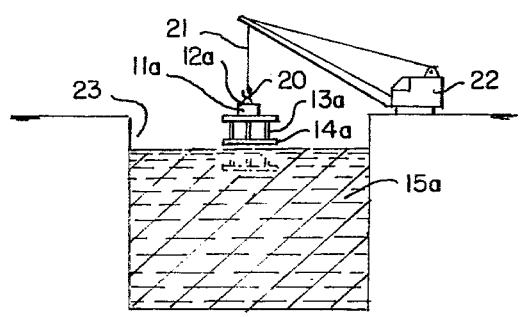
FIG. 2 is a side elevational view of a lock in a waterway with the lock in section showing the apparatus of this invention used to prevent ice formation in the lock.

In FIG. 2, I have illustrated an apparatus essentially the same as that of FIG. 1 with like parts bearing like identifying numerals with the suffix a. In this embodiment the lift ring 12a is on a hook 20 on a lift cable 21 of a crane 22 movable along a lock 23. The probes 13a and vanes 14a are lowered into the water 15a within locks 23 and the eccentrics within vibratory case 11a are energized to cause probes 13a and 14a to vibrate, thereby agitating the normally quiet water 15a within the lock 23 to prevent its surface from freezing.

Figure 3:
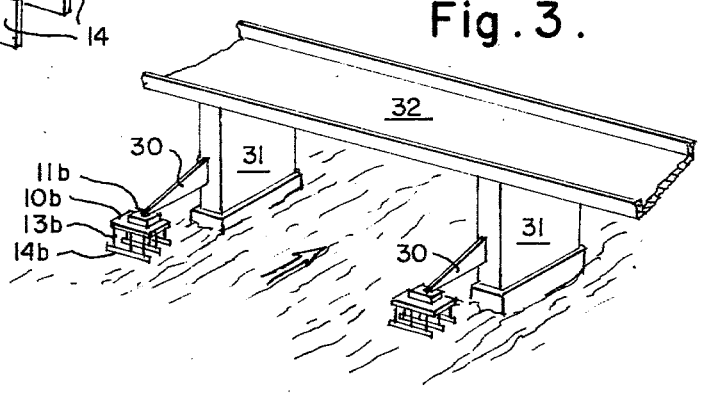
FIG. 3 is an isometric view of an arrangement using this invention on the piers of bridges to prevent ice packs from forming.

In FIG. 3 I have illustrated another embodiment of my invention in which again those parts which are the same as FIG. 1 are given like numerals with the suffix b. In this embodiment the vibratory case 11b is permanently suspended from an arm 30 extending up river from a bridge abutment 31 carrying bridge 32. Normally the vibratory case is not operated, however, when there is danger of ice formation and the accumulation of ice packs against the abutment, the rotating eccentrics of vibratory case 11b are energized and thereby the base plate 10b and probes 13b and vanes 14b. This vibration, the probes 13b and vanes 14b causes the water in the stream ahead of the abutment 31 to be agitated preventing the formation of ice and its attachment to the abutment and prevents the accumulation of ice and jamming of ice against the abutment.

Figure 4:
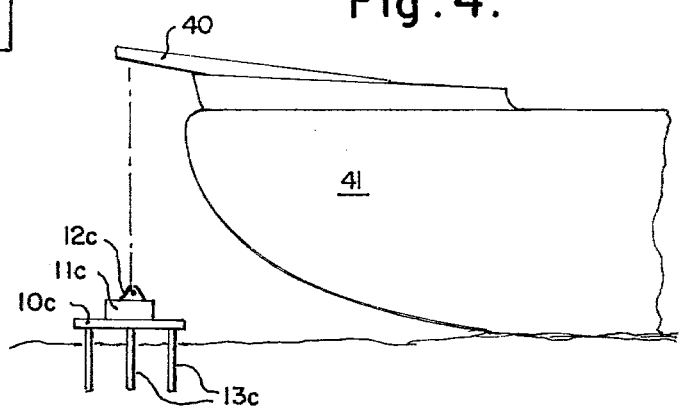
FIG. 4 is a side elevational view of the apparatus of this invention suspended from the bow of an ice breaking vessel as an ice breaker to assist in the ice breaking operation.

In FIG. 4 I have illustrated the apparatus of this invention suspended from an arm 40 at the bow of an ice breaker ship 41. Here again those parts which are the same as those of FIG. 1 bear like numerals with the suffix c. In this particular embodiment only probes 13c are illustrated without vanes, however, vanes may be used if desired. In operation the eccentrics of the vibratory case 11c are energized, transmitting vibrations to probes 13c which break up the ice in advance of the bow of the ice breaker ship.

Figure 5:
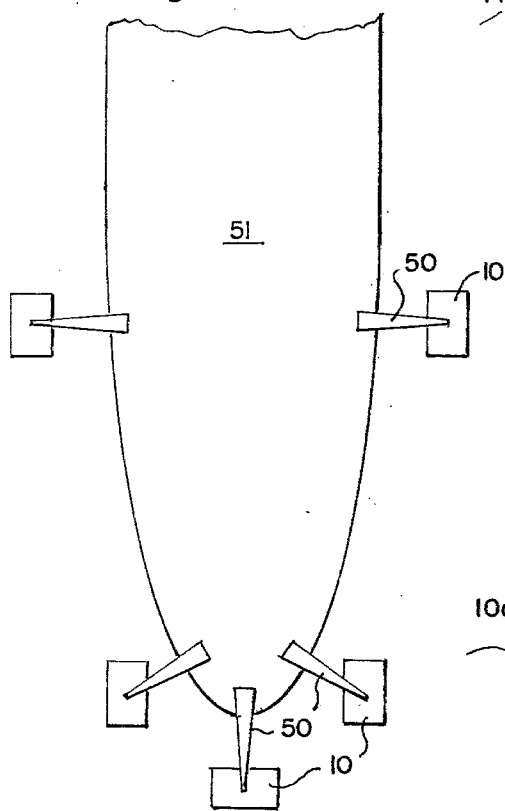
FIG. 5 is a top plan view of another arrangement of this invention in combination with an ice breaking vessel to assist in breaking ice and prevent it from packing or forming along the vessel.

In FIG. 5 I have illustrated a plurality of units according to my invention suspended from arm 50 at the bow and sides of an ice breaker ship 51 and operating as in FIG. 4 to break up the ice and keep it loose as the ice breaking ship moves through it.

In the foregoing specification I have set out certain preferred practices and embodiments of my invention, however, it will be understood that this invention may be otherwise embodied within the scope of the following claims.

I claim:

1. An apparatus for agitating liquids, to maintain solids in suspension in liquid systems and breaking up ice and the like, comprising a base plate generally movable in all directions, a plurality of spaced depending probes fixed on said plate for immersion in the liquid to be agitated and vibratory means on said base plate inducing vibration in said base plate and probes, said probes and plate being moved in unison and wherein said probes are in generally side-by-side alignment on said plate and the ends of said aligned probes remote from said plate are connected by a vane member whose plane is transverse to the plane of the said plate.

2. An apparatus for agitating liquids, to maintain solids in suspension in liquid systems and breaking up ice and the like, comprising a base plate generally movable in all directions, a plurality of spaced depending probes fixed on said plate for immersion in the liquid to be agitated and vibratory means on said base plate inducing vibration in said base plate and probes, said probes and plate being moved in unison and wherein said probes are fixed on said plate in a plurality of spaced generally parallel lines, the probes in each line being in generally side-by-side alignment on said plate and the ends of each probe remote from said plate in each said line being connected together by a vane member whose plane is transverse to the plane of said plate.

* * * * *

UNITED STATES PATENT AND TRADEMARK OFFICE
CERTIFICATE OF CORRECTION

PATENT NO. : 4,252,444
DATED : February 24, 1981
INVENTOR(S) : ALVIN E. HERZ

It is certified that error appears in the above-identified patent and that said Letters Patent are hereby corrected as shown below:

In the Abstract, line 5, after "agitated", "in" should read --is--.

Signed and Sealed this

Twelfth Day of May 1981

[SEAL]

Attest:

RENE D. TEGTMEYER

Attesting Officer     Acting Commissioner of Patents and Trademarks